May 26, 1942. W. J. HALL 2,284,421
MOLDING
Filed Jan. 20, 1938
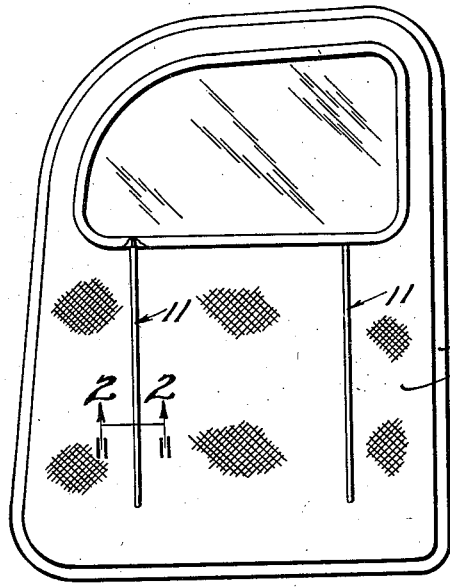
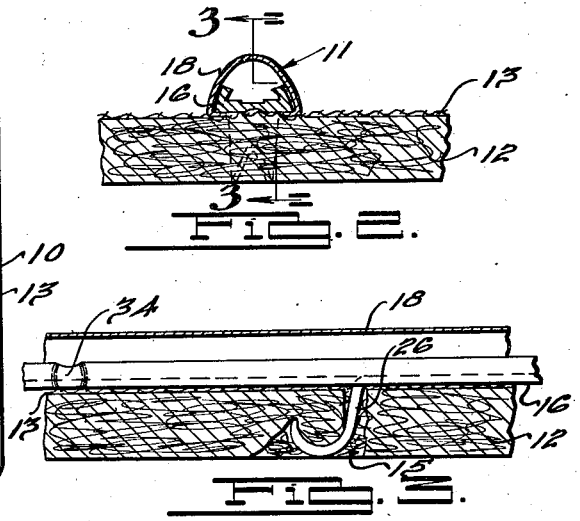
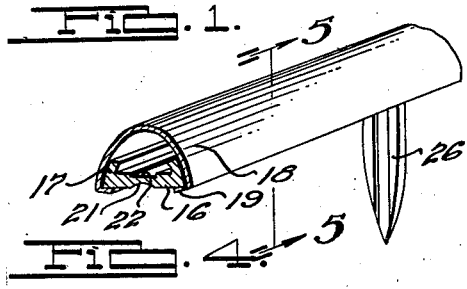
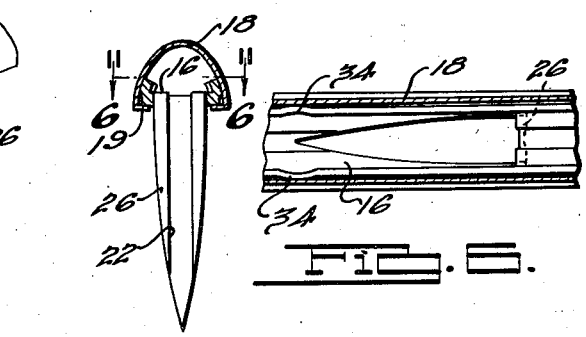
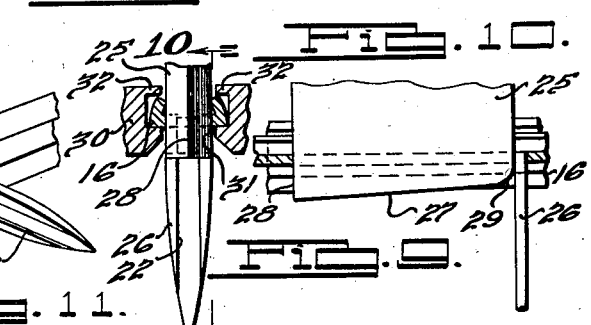
INVENTOR
William J. Hall.
BY Harness, Dickey & Pierce.
ATTORNEYS.

Patented May 26, 1942

2,284,421

UNITED STATES PATENT OFFICE 2,284,421

MOLDING

William J. Hall, Detroit, Mich., assignor to Herron-Zimmers Moulding Company, Detroit, Mich., a corporation of Illinois Application January 20, 1938, Serial No. 185,811

4 Claims. (Cl. 20—74)

The invention relates generally to molding and it has particular relation to molding for use on automobiles for ornamental purposes.

Generally, also, the invention constitutes an improvement over that embodied in the application for patent of Orley J. Crowe, Serial No. 185,833 filed January 20, 1938. In the latter application for patent, molding is disclosed which comprises an inner base strip having prongs struck therefrom for fastening the molding in place, and an outer ornamental cover that is held on the inner strip.

One object of the present invention is to provide improvements in the molding which enable obtaining stronger or stiffer prongs while still permitting the use of an inner base strip of relatively malleable material.

Another object of the invention is to provide an improved molding having prongs so constructed and designed that highly efficient methods of manufacturing the molding in large volume may be employed.

Another object of the invention is to provide a highly efficient method of producing the inner or base strip and striking the prongs therefrom.

Another object of the invention is to provide improved molding having an inner base strip of relatively heavy or thick stock while still having prongs struck therefrom provided with thin and pointed ends.

Another object of the invention is to provide improved means for holding the ornamental cover and the inner base strip against relative longitudinal movement once they are assembled.

Other objects of the invention will become apparent from the following specification, the drawing to which it relates, and from the claims hereinafter set forth.

For a better understanding of the invention, reference may be had to the drawing, wherein:

Figure 1 illustrates the inner side of an automobile door having molding applied thereto according to one form of the invention;

Fig. 2 is a cross-sectional view on a larger scale taken substantially along the line 2—2 of Fig. 1.

Fig. 3 is a cross-sectional view taken substantially along the line 3—3 of Fig. 2;

Fig. 4 is a fragmentary view illustrating the molding as assembled prior to applying it to the door;

Fig. 5 is a cross-sectional view taken substantially along the line 5—5 of Fig. 4;

Fig. 6 is a cross-sectional view taken substantially along the line 6—6 of Fig. 5;

Fig. 7 is a fragmentary view illustrating the ornamental cover prior to assembling it with the inner base strip;

Fig. 8 is a similar fragmentary view of the inner base strip prior to its assembly with the cover;

Fig. 9 is a cross-sectional view illustrating the manner in which the prongs are struck from the inner base strip;

Fig. 10 is a cross-sectional view taken substantially along the line 10—10 of Fig. 9; and Fig. 11 is a side view, somewhat on the order of Fig. 10, showing the manner in which a plurality of the prongs are struck from the base strip simultaneously.

Referring to Figure 1, an automobile door is indicated at 10 and molding applied to the inner side of the door is indicated at 11. As best shown by Figures 2 and 3, the inner side of the door ordinarily is provided with a cover that comprises a fibre board 12 and an outer covering of fabric 13, and for the purpose of applying the molding, the fibre board and fabric are provided with spaced openings 15 adapted to receive fastening means on the molding. The molding comprises an inner base strip 16 having upwardly and inwardly turned edge flanges 17 and an outer cover 18 having inwardly turned edges 19 that engage under the edges of the inner strip. In a construction of this character, the inner strip may be manufactured from less expensive metal owing to the fact that it is concealed by the outer cover and for this purpose cold rolled steel has been found very satisfactory, as it is malleable and inexpensive. On the other hand, the cover, due to the fact that it is exposed and provides the ornamentation, is manufactured from material more suited for the purpose, such as stainless steel. It is apparent that by using an inner base strip for fastening purposes and an outer strip for ornamental purposes, the latter may be constructed of thin steel stock compared to the inner strip. Thus, less of the more expensive stainless steel in the particular case stated is required.

The shape of the cover 18 may be varied according to the ornamentation desired and in the construction illustrated, it is substantially semi-circular in cross section. It will be noted that the flanges 17 on the inner strip are shaped substantially in accordance with the shape of the cover and when the parts are assembled, such flanges fit substantially against the inner surface of the cover and in conjunction with the edges 19 of the latter, this relation prevents transverse relative movement of the parts. It might be stated here that preferably the strips will be assembled by a longitudinal telescopic movement, although by reducing the width of the edges 19 on the cover, the latter could be pushed downwardly over the flanges 17 on the inner strip and such edges 19 snapped under the edges of the inner strip.

In manufacturing the inner, or base strip 16, a strip of steel such as cold rolled steel is passed between rollers for forming it to the shape desired, that is, to form the flanges 17, and thereafter the strip passes between rollers which form a groove 21 in the lower side of the strip and a shallow but wider recess 22 in the upper side of the strip. This is important for several reasons. In the first place, the steel is strain hardened by cold working in the central regions from which, as will presently be seen, the prongs are to be struck out. Again, formation of the groove and recess thins the metal, and this enables formation of a thin and finer point on the prongs.

Referring to Figures 9, 10, and 11, the strip 16, after it has passed between the rollers which form the groove 21 and recess 22, passes under a plurality of punches, such as indicated at 25, adapted to strike out the prongs, indicated at 26, from the base portion of the strip. Each of these punches has its bottom edge tapered, as indicated at 27, so that the point of the prong will be struck first from the strip 16. Each prong also has side faces which may be approximately parallel for a substantial distance toward the front edge, and then converging to a line, indicated at 28. The rear end of the punch is rounded, as indicated at 29, so that the struck out portion finally will be bent away from the strip 16 to provide the prong.

During its passage under the punches, the strip 16 is supported by a member 30 having a slot 31 which is slightly wider than the prong at its widest part and from this it will be seen that the prongs will be struck out and bent into the slot. Short flanges 32 prevent the strip from moving upwardly with the punches when the punches are moved upwardly after the prongs are struck out. The slot 31 continues to the discharge end of the member 30 and consequently, after the punches are raised, the strip may be moved linearly without raising it, to place the next part of the strip under the punches. Thus, only a linear movement of the strip 16 is required and this greatly simplifies the method of manufacture and apparatus required.

The width of the prong through the greater part of its length is greater than the width of recess 22 and accordingly the side cutting edges of the punch through such greater part of the prong length, cut through metal that is not cold worked at least to the extent of the recessed portion. While the portion of the prong near the point is much harder, and therefore harder to cut, this is cut first and due to the still largely solid character of the strip, it is found that the point is struck clearly without undesirable bending or irregularity even though the member 30 does not support the strip at the center of the latter. Completion of the cutting of the prong after cutting through the harder point portion is not as difficult as the metal is softer and moreover it is more directly supported by member 30.

It will be noted that the groove 21 and recess 22 reduce the thickness of the point portion of the prong and this in conjunction with the converging side edges of the point portion, results in a sharp point.

At the time the prongs are formed, the flanges 17 on strip 16 are slightly upset by a tool for this purpose which moves downwardly with the punches, so as to form wider spots 34. Then when the strip and cover are telescopically assembled, the cover, in passing over the upset portion 34 on the inner strip, deflects somewhat and in a sense locks around the upset portion, although the outward deflection of the cover is really not noticeable. It may be noted that the upset portion 34 will be provided at one end of the strip 16, so that the little greater force required in moving the cover over the strip will not be necessary until the parts are practically assembled, that is, not until after most of the telescopic movement has occurred. In connection with the length of the strip 16, it may be noted that after the prongs are formed in the inner strip, it is cut into lengths, as may be desired, and the upset portions 34 will correspond in position and number to the length of the strips.

After telescopically assembling the parts, or by snapping on the outer cover, as may be the case, the molding may be applied by pressing the prongs through the openings 15 in the door cover, and after this, the prongs may be bent over, as shown in Figure 3. This locks the molding tightly in place.

While it has been more particularly indicated that the inner strip may be of steel, it will be recognized that other materials might be used depending on use of the molding. In many materials, the groove and recess will strengthen the prong portions and in all cases they will effect a sharper point. Different cover strips may be used instead of the cover 17 as indicated in the application for patent of Orley J. Crowe to which attention has previously been directed.

The invention provides a highly efficient construction which can be manufactured inexpensively. Formation of the prongs is effected very simply by means of the punches, and it is only necessary to interrupt the movement of the inner strip sufficiently to allow the punches to operate in order to form the prongs. It is not necessary to lift the strip after the prongs are formed, so as to free such prongs from lower die members, as in the particular or present instance the lower die member is only a support having a slot of continuous character that is wide enough to allow the prongs to move along through it. It may be added that the strip may be cut into suitable lengths and that suitable means may be provided so that on each downward movement of the punches, the strip may be cut linearly ahead of the prongs being struck out. Assembly of the parts after their fabrication and application of the molding manifestly require only simple operations.

Although only one form of the invention has been illustrated and described in detail, it will be apparent to those skilled in the art that various modifications may be made without departing from the scope of the appended claims.

What I claim is:

1. Molding comprising an elongated strip of metal having a longitudinally extending portion of strain hardened character, and prongs struck out from the strip intermediate its side edges and projecting from one side thereof, with each prong having a strain hardened portion constituting a continuation of that in the body of the strip, each of the prongs beginning with its end connected to the strip, having its side edges extended first along side edges of the strain hardened portion and then converging across the strain hardened portion to substantially a point.

2. Molding comprising an elongated strip of relatively heavy, malleable metal having a longitudinally extending portion of strain hardened character, prongs struck out from the strain hardened portion of the strip and disposed in longitudinally spaced relation and projecting from one side of the strip, each prong being so struck out and bent from the strip that the strain hardened portion continues along the strip and then from the bent ends of the prongs to the free ends thereof with such strain hardened portion bent transversely at the junction where the prong is bent away from the strip, and a cover for that side of the strip opposite the prongs and engaging the side edge portions of the strip.

3. Molding comprising an elongated strip of relatively heavy, malleable metal having a longitudinally extending grooved portion of strain hardened character, prongs struck out from such portion and disposed in longitudinally spaced relation and projecting from one side of the strip, each prong being so struck out and bent from the strip that the groove and strain hardened portion continues along the strip and then from the bent ends of the prongs to the free ends thereof with such grooved strain hardened portion bent transversely at the junction where the prong is bent away from the strip, and a cover for that side of the strip opposite the prongs and engaging the side edge portions of the strip.

4. Molding comprising an inner elongated strip of steel substantially flat between its side edges and having a longitudinally extending groove pressed into it substantially midway between its side edges and extending substantially throughout the length of the strip, prongs struck out from the grooved portion of the strip and disposed in longitudinally spaced relation and projecting from one side of the strip, each prong being so struck from the strip that the grooved portion continues from one end of the prong to the other with such grooved portion being bent transversely at the junction where the prong is bent away from the strip, and a cover for that side of the strip opposite the prongs and engaging under the side edges of the strip.

WILLIAM J. HALL.